United States Patent
Kim et al.

(10) Patent No.: US 8,940,825 B2
(45) Date of Patent: Jan. 27, 2015

(54) SEALING COMPOSITION FOR HDD MOTOR AND HDD MOTOR FABRICATED USING THE SAME

(75) Inventors: Kun Kim, Gyunggi-do (KR); Hyung Kyu Kim, Daejeon (KR)

(73) Assignee: Samsung Electro-Mechanics Co., Ltd., Suwon, Gyunggi-Do (KR)

(*) Notice: Subject to any disclaimer, the term of this patent is extended or adjusted under 35 U.S.C. 154(b) by 277 days.

(21) Appl. No.: 13/408,570

(22) Filed: Feb. 29, 2012

(65) Prior Publication Data

US 2013/0162074 A1 Jun. 27, 2013

(30) Foreign Application Priority Data

Dec. 22, 2011 (KR) .................. 10-2011-0140027

(51) Int. Cl.
*C08K 5/07* (2006.01)

(52) U.S. Cl.
USPC ........ 524/359; 524/300; 526/302; 526/317.1; 526/318; 526/318.4

(58) Field of Classification Search
USPC .............. 524/300, 359; 526/302, 317.1, 318, 526/318.4
See application file for complete search history.

(56) References Cited

U.S. PATENT DOCUMENTS

2009/0229747 A1* 9/2009 Olson et al. ............... 156/305

FOREIGN PATENT DOCUMENTS

| JP | 2005-298765 | 10/2005 |
| KR | 10-2000-0068168 A | 11/2000 |

* cited by examiner

*Primary Examiner* — Edward Cain
(74) *Attorney, Agent, or Firm* — McDermott Will & Emery LLP

(57) ABSTRACT

There are provided a sealing composition for a hard disk drive (HDD) motor and a HDD motor fabricated using the same. The sealing composition includes: 45 to 65 parts by weight of urethane methacrylate; 35 to 50 parts by weight of methacrylate; and 2 to 4 parts by weight of acrylic acid. A sealing composition having a new composition is used as a sealing material of a flexible printed circuit (FPC) adhering part of the HDD motor, whereby a haze phenomenon due to air leak and outgas at the FPC adhering part may be improved and reliability of a HDD motor may be enhanced due to a reduction in generation of the outgas of the adhering part.

13 Claims, 3 Drawing Sheets

B-B'

SEALING COMPOSITION FOR HDD MOTOR AND HDD MOTOR FABRICATED USING THE SAME

CROSS-REFERENCE TO RELATED APPLICATIONS

This application claims the priority of Korean Patent Application No. 10-2011-0140027 filed on Dec. 22, 2011, in the Korean Intellectual Property Office, the disclosure of which is incorporated herein by reference.

BACKGROUND OF THE INVENTION

1. Field of the Invention

The present invention relates to a sealing composition for a hard disk drive (HDD) motor capable of securing quality and reliability, as well as improving workability by reducing generation of outgas, and a HDD motor fabricated using the same.

2. Description of the Related Art

A hard disk drive (HDD), an information storage device, reads data stored on a disk or writes data to the disk using a read/write head.

The hard disk drive requires a disk driving device capable of driving the disk. In the disk driving device, a small-sized spindle motor is used.

This small-sized spindle motor has used a fluid dynamic bearing assembly. Lubricating fluid is interposed between shaft, a rotating member of the fluid dynamic bearing assembly, and a sleeve, a fixed member thereof, such that the shaft is supported by dynamic fluid pressure generated in the lubricating fluid.

Meanwhile, in fabricating the HDD motor, a sealing process has additionally been performed in a flexible printed circuit (FPC) adhering part of the motor in order to prevent air leaks and coil disconnection.

The sealing process is undertaken to secure reliable quality and to improve workability by reducing the generation of outgas in products.

However, in the case in which a scheme of reinforcing sealing for the FPC adhering part using an ultraviolet curable adhesive material is used, it may be difficult to secure the reliability due to the generation of an outgas.

In addition, a high temperature process for curing may be performed for an extended period of time, thereby causing deterioration in workability efficiency.

Therefore, customer demand for securing quality and reliability in the HDD motor has increased. Particularly, due to a defect in outgas of a motor complementarily assembled by an adhesive, a complementary material, an error may occur in a storage function of the HDD. Therefore, pre-testing for securing reliability by quantitatively standardizing an outgassing of an adhesive material has necessarily been emphasized before the mass-production of products.

Related Art Document

Japanese Patent Laid-Open Publication No. 2005-298765

SUMMARY OF THE INVENTION

An aspect of the present invention provides a sealing composition for a hard disk drive (HDD) motor capable of securing reliable quality and improving workability by reducing a generation of an outgas, and a HDD motor fabricated using the same.

According to an aspect of the present invention, there is provided a sealing composition for a hard disk drive (HDD) motor including: 45 to 65 parts by weight of urethane methacrylate; 35 to 50 parts by weight of methacrylate; and 2 to 4 parts by weight of acrylic acid.

The sealing composition may further include 2 to 4 parts by weight of benzophenone.

The sealing composition may further include 1 to 2 parts by weight of a stabilizer.

The sealing composition may further include 1 to 2 parts by weight of an accelerator.

The methacrylate may have a boiling point of 150° C. or more.

The sealing composition may be applied to an adhering part by which a flexible printed circuit (FPC) and a coil of the HDD motor are adhered to each other.

The adhering part may be a land part by which the coil is adhered to the FPC.

According to another aspect of the present invention, there is provided a HDD motor including a sealing resin formed on an adhering part between a FPC and a coil of the HDD motor. The sealing resin is formed from a sealing composition including 45 to 65 parts by weight of urethane methacrylate, 35 to 50 parts by weight of methacrylate, and 2 to 4 parts by weight of acrylic acid.

The sealing composition may further include 2 to 4 parts by weight of benzophenone.

The sealing composition may further include 1 to 2 parts by weight of a stabilizer.

The sealing composition may further include 1 to 2 parts by weight of an accelerator.

The adhering part may be a land part by which the coil is adhered to the FPC.

The methacrylate may have a boiling point of 150° C. or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
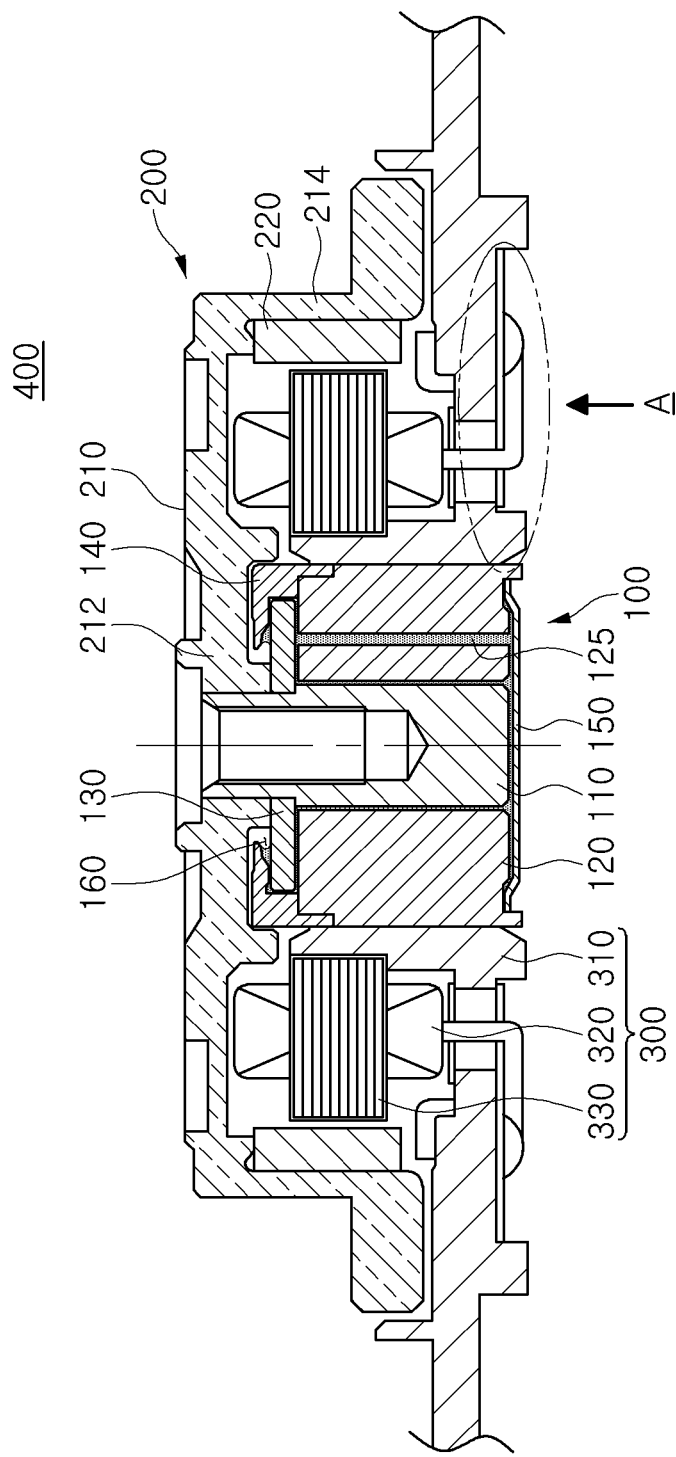
FIG. 1 is a schematic perspective view showing a HDD motor according to an embodiment of the present invention.

Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a schematic perspective view showing a HDD motor according to an embodiment of the present invention.

Figure 2:
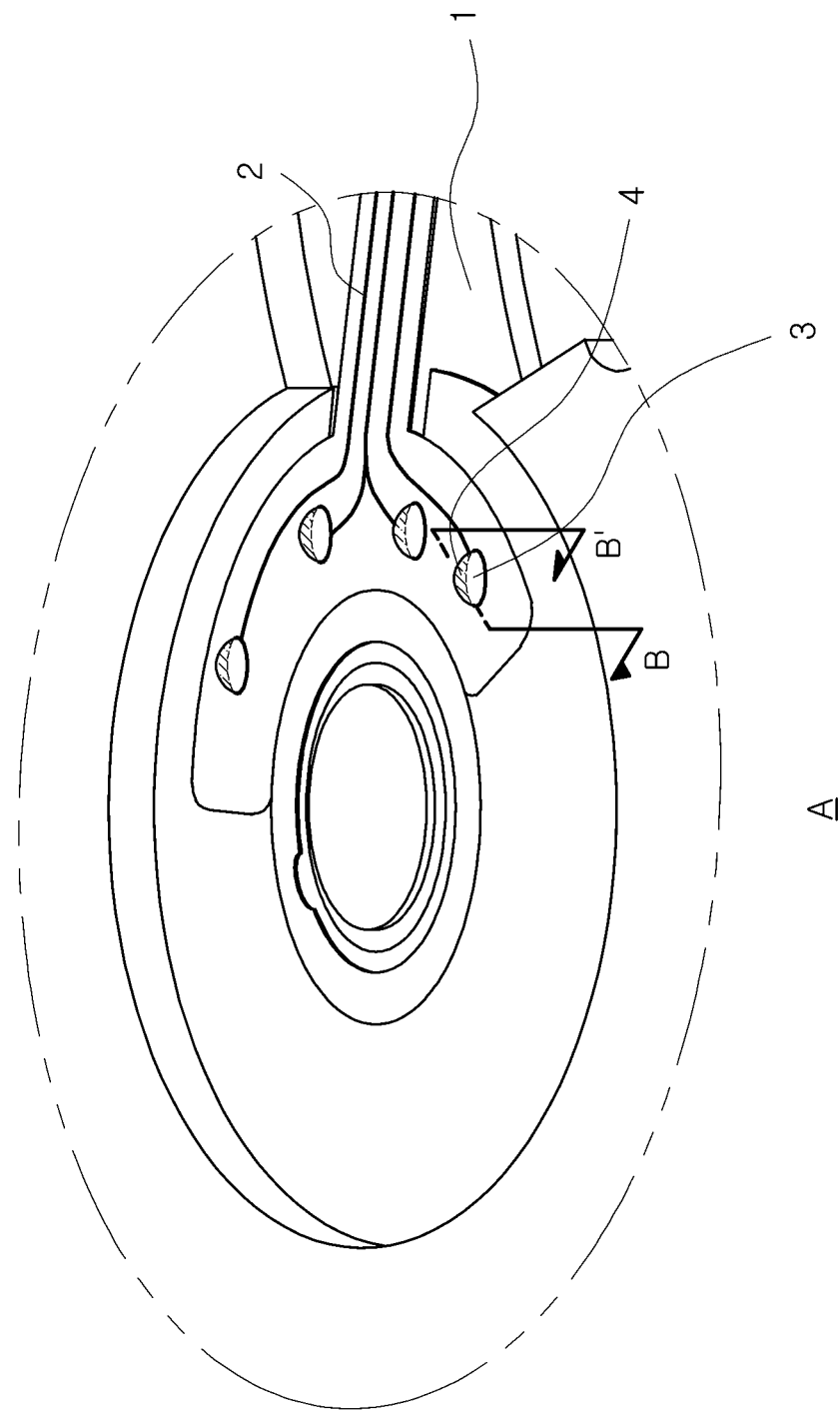
FIG. 2 is a schematic enlarged view of part A of FIG. 1 viewed from the bottom.
Figure 3:
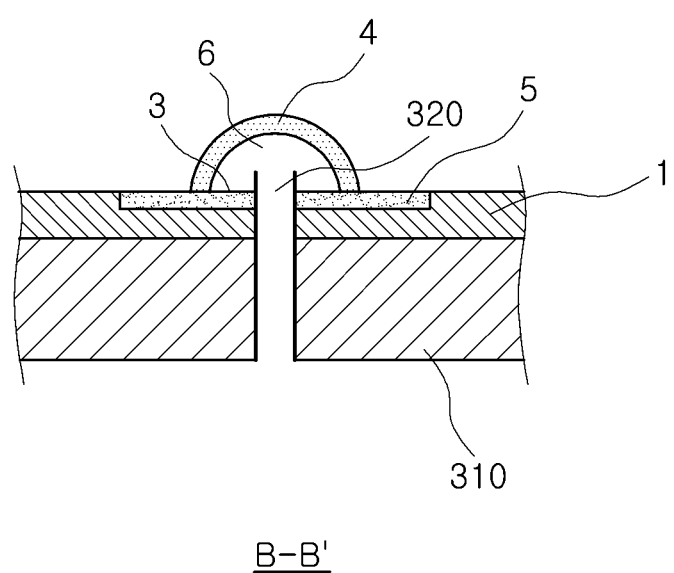
FIG. 3 is a cross-sectional view taken along line B-B' of FIG. 2.

FIG. 2 is a schematic enlarged view of part A of FIG. 1 viewed from the bottom; and FIG. 3 is a cross-sectional view taken along line B-B' of FIG. 2.

Referring to FIGS. 1 through 3, a sealing composition 4 for a hard disk drive (HDD) motor may include 45 to 65 parts by weight of urethane methacrylate; 35 to 50 parts by weight of methacrylate; and 2 to 4 parts by weight of acrylic acid.

Hereinafter, the above configuration will be described in detail.

The sealing composition 4 for a HDD motor according to the embodiment of the present invention may include 45 to 65 parts by weight of urethane methacrylate.

When the urethane methacrylate is applied to an adhering part 3 by which a flexible printed circuit (FPC) and a coil 2 of a hard disk drive (HDD) motor to be described below are adhered to each other, it may serve to form a cured coating on the adhering part 3, impart adhesion with a soldering of the adhering part 3, and have an effect on physical properties of the cured coating.

A content of the urethane methacrylate may be 45 to 65 parts by weight. When the content of the urethane methacrylate is less than 45 parts by weight, adhesion may be relatively reduced, and when the content of the urethane methacrylate exceeds 65 parts by weight, outgas may be generated.

In addition, the sealing composition 4 for a HDD motor may include 35 to 50 parts by weight methacrylate The methacrylate may have a boiling point of 150° C. or more and is not particularly limited as long as it has a high boiling point.

The methacrylate may serve to form the cured coating at a relatively high boiling point, whereby a haze phenomenon due to generation of outgas may be improved.

Therefore, in a case in which a boiling point of the methacrylate is less than 150° C., the outgas may be generated.

In addition, the sealing composition 4 for a HDD motor may include 2 to 4 parts by weight of acrylic acid.

The acrylic acid may serve to improve adhesion of an adhesive and impart functionality to the sealing resin.

A content of the acrylic acid may be 2 to 4 parts by weight. When the content of the acrylic acid is less than 2 parts by weight, the adhesion may be reduced and a curing speed may be reduced, such that it is difficult to improve the haze phenomenon due to the generation of the outgas, and when the content of the acrylic acid exceeds 4 parts by weight, physical properties of the sealing resin may be deteriorated.

The sealing composition 4 for a HDD motor according to the embodiment of the present invention may further include 2 to 4 parts by weight of benzophenone.

The benzophenone, serving as a photo initiator, may be decomposed and activated by ultraviolet energy to contribute to polymerization of the composition.

According to the embodiment of the present invention, the sealing composition 4 for a HDD motor may further include 2 to 4 parts by weight of benzophenone, such that a curing speed of the sealing composition may be controlled, whereby the haze phenomenon may be improved due to a reduction in the generation of the outgas.

Therefore, reliability of a HDD motor product fabricated using the sealing composition 4 for a HDD motor and the workability may be improved.

The sealing composition 4 for a HDD motor may include to 2 to 4 parts by weight of benzophenone. When a content of the benzophenone is less than 2 parts by weight, a curing speed may be reduced, such that an effect of reducing the generation of the outgas may not be accomplished, thereby having a difficulty in improving the haze phenomenon, and when the content of the benzophenone exceeds 4 parts by weight, physical properties of the sealing resin may be deteriorated.

The sealing composition 4 for a HDD motor according to the embodiment of the present invention may further include 1 to 2 parts by weight of stabilizer and 1 to 2 parts by weight of accelerator.

The stabilizer and the accelerator may serve as functional additives for stabilizing an adhesive function of the sealing composition and imparting activity thereto.

The sealing composition 4 for a HDD motor according to the embodiment of the present invention may include each of 1 to 2 parts by weight of stabilizer and accelerator. When each of contents of the stabilizer and the accelerator is less than 1 part by weight, an effect of stabilizing the adhesive function and imparting the activity may be relatively small, and when each of contents of the stabilizer and the accelerator exceeds 2 parts by weight, a defect may be generated in workability and physical properties of the sealing composition due to addition of an excessive amount.

The sealing material 4 for a HDD motor according to the embodiment of the present invention may be applied to, for example, an adhering part by which a flexible printed circuit (FPC) and a coil of the HDD motor are adhered to each other, but is not particularly limited thereto.

The adhering part may be a land part 5 by which the coil is adhered to the FPC.

That is, the sealing composition 4 for a HDD motor may be applied to the adhering part by which the FPC and the coil of the HDD motor are adhered to each other, whereby the haze phenomenon due to air leak and outgas may be improved and reliability of a HDD motor may be enhanced due to the reduction in the generation of the outgas.

A HDD motor according to another embodiment of the present invention may include a sealing resin composition formed on an adhering part between a FPC and a coil of the HDD motor and including 45 to 65 parts by weight of urethane methacrylate resin, 35 to 50 parts by weight of methacrylate resin, and 2 to 4 parts by weight of acrylic acid.

Hereinafter, the HDD motor according to another embodiment of the present invention will be described in detail. However, a description of a portion overlapped with the description in the above-mentioned embodiment of the present invention will be omitted.

In the HDD motor according to another embodiment of the present invention, a fixed member may be a sleeve 120 and a cap 140, and a rotating member may be a shaft 110, a thrust plate 130, and a hub 212.

In addition, the HDD motor may include an oil sealing part 160 formed between fixed members 120 and 140 and rotating members 110, 130 and 212, particularly, between the sleeve 120, the thrust plate 130, and the cap 140.

The cap 140 may be a member that is press-fitted to an upper portion of the thrust plate 130 to thereby allow a lubricating fluid to be sealed between the cap 140 and the thrust plate 130, and include a circumferential groove formed in a circumferential surface thereof so as to be press-fitted into the thrust plate 130 and the sleeve 120.

The cap 140 may include a protrusion part formed on a lower surface thereof in order to seal the lubricating fluid, which uses a capillary phenomenon and a surface tension of the lubricating fluid in order to prevent the lubricating fluid from being leaked to the outside at the time of driving of the motor.

Meanwhile, a HDD motor 400 according to another embodiment of the present invention may include the shaft 110, the sleeve 120, the thrust plate 130, the cap 140, and the oil sealing part 160.

The sleeve 120 may support the shaft 110 so that an upper end of the shaft 110 protrudes upwardly in an axial direction, and may be formed by forging copper (Cu) or aluminum (Al) or sintering copper-iron (Cu—Fe) based alloy powders or SUS based powders.

Here, the shaft 110 may be inserted into a shaft hole of the sleeve 120 so as to have a micro clearance therebetween. The micro clearance may be filled with the lubricating fluid, and the rotation of a rotor 200 may be more smoothly supported by a radial dynamic groove formed in at least one of an outer circumferential surface of the shaft 110 and an inner circumferential surface of the sleeve 120.

The radial dynamic groove may be formed in an inner side of the sleeve 120, which is an inner portion of the shaft hole of the sleeve 120, and may generate pressure so as to be deflected toward one side at the time of rotation of the shaft 110.

However, the radial dynamic groove is not limited to being formed in the inner side of the sleeve 120 as described above but may also be formed in an outer circumferential surface portion of the shaft 110. In addition, the number of radial dynamic grooves is not limited.

The sleeve 120 may include a bypass channel 125 formed therein in order to allow upper and lower portions thereof to be communication with each other to disperse pressure of the lubricating fluid in an inner portion of a fluid dynamic bearing assembly 100, thereby maintaining balance in the pressure, and may move air bubbles, or the like, present in the inner portion of the fluid dynamic bearing assembly 100 so as to be discharged by circulation.

Here, the sleeve 120 may include a cover plate 150 coupled to a lower portion thereof, having a clearance therebetween, wherein the clearance receives the lubricating fluid therein.

The cover plate 150 may receive the lubricating fluid in the clearance between the cover plate 150 and the sleeve 120 to thereby serve as a bearing supporting a lower surface of the shaft 110.

The thrust plate 130 may be disposed on an upper portion of the sleeve 120 in the axial direction and includes a hole formed at the center thereof, wherein the hole is formed to correspond to a cross section of the shaft 110. The shaft 110 may be inserted into this hole.

Here, the thrust plate 130 may be separately fabricated and then coupled to the shaft 110. However, the thrust plate 130 may be formed integrally with the shaft 110 at the time of fabricating thereof and may rotate together with the shaft 110 at the time of the rotation of the shaft 110.

In addition, the thrust plate 130 may include a thrust dynamic groove formed in an upper surface thereof, wherein the thrust dynamic groove provides thrust dynamic pressure to the shaft 110.

The thrust dynamic groove is not limited to being formed in the upper surface of the thrust plate 130 as described above but may also be formed in an upper surface of the sleeve 120 corresponding to a lower surface of the thrust plate 130.

The stator 300 may include a coil 320, a core 330, and a base member 310.

In other words, the stator 300 may be a fixed structure including the coil 320 generating electromagnetic force having a predetermined magnitude at the time of application of power and a plurality of cores 330 having the coil 320 wound therearound.

The core 330 may be fixedly disposed on an upper portion of the base member 310 including a FPC 1 having pattern circuits 2 printed thereon, a plurality of coil holes having a predetermined size may be formed to penetrate through the base member 310 so as to expose the coil 320 downwardly, penetrating a portion of the base member 310 corresponding to the coil 320, and the coil 320 may be electrically connected to the FPC 1 so that external power is supplied thereto.

An outer peripheral surface of the sleeve 120 may be press-fitted into the base member 310 to thereby be fixed thereto, and the core 330 having the coil 320 wound therearound may be inserted into the base member 310. In addition, the base member 310 and the sleeve 120 may be assembled with each other by applying an adhesive to an inner surface of the base member 310 or an outer surface of the sleeve 120.

The rotor 200, which is a rotational structure rotatably provided with respect to the stator 300, may include a rotor case 210 having an annular ring shaped magnet 220 provided on an outer peripheral surface thereof, wherein the annular ring shaped magnet 220 corresponds to the core 330, having a predetermined interval therebetween.

Here, as the magnet 220, a permanent magnet generating magnetic force having predetermined strength by alternately magnetizing an N pole and an S pole thereof in a circumferential direction may be used.

Here, the rotor case 210 may include a hub base 212 press-fitted into the upper end of the shaft 110 to thereby be fixed thereto and a magnet support part 214 extended from the hub base 212 in an outer diameter direction and bent downwardly in the axial direction to thereby support the magnet 220.

A HDD motor according to another embodiment of the present invention may include a sealing resin formed on an adhering part between a FPC and a coil of the HDD motor. The sealing resin is formed from a sealing composition including 45 to 65 parts by weight of urethane methacrylate, 35 to 50 parts by weight of methacrylate, and 2 to 4 parts by weight of acrylic acid.

The sealing composition includes 45 to 65 parts by weight of urethane methacrylate, 35 to 50 parts by weight of methacrylate, and 2 to 4 parts by weight of acrylic acid to reduce the generation of the outgas, whereby reliable quality of the HDD motor may be secured.

In addition, the sealing composition further includes 2 to 4 parts by weight of benzophenone, such that a curing speed of the sealing composition may be controlled, whereby the haze phenomenon may be improved due to a reduction in the generation of the outgas.

A fabricating method of the HDD motor 400 may be the same as a general fabricating method except that the sealing composition 4 according to the embodiment of the present invention is applied to the adhering part 3 by which the FPC 1 and the coil 2 of the HDD motor are adhered to each other to thereby adhere the FPC 1 and the coil 2 to each other.

The following Table 1 is a table in which haze phenomena due to generation of outgas of a HDD motor fabricated using a sealing composition according to Inventive Example and a HDD motor fabricated using a sealing composition according to Comparative Example are compared with each other.

More specifically, a sealing composition according to Inventive Example was prepared to include 60 parts by weight of urethane methacrylate, 40 parts by weight of methacrylate, 4 parts by weight of acrylic acid, and a 4 parts by weight of benzophenone.

Meanwhile, a sealing composition according to Comparative Example was prepared to include 60 parts by weight of urethane methacrylate, 40 parts by weight of methacrylate, 0.5 parts by weight of silane coupling agent, 3 parts by weight of organic hydroperoxide, and 2 parts by weight of photo initiator.

Next, each of the sealing compositions according to Inventive Example and Comparative Example was applied to an adhering part by which a FPC and a coil of a HDD motor are adhered to each other and then cured at a temperature of 110° C. for 120 minutes to fabricate a motor.

The following test for comparing haze phenomena with each other was performed by checking whether or not a haze phenomenon was generated at the initial stage, after 24 hours elapse, and after 240 hours elapse at a temperature of 110° C. and a relative humidity of 80% under the conditions of 3300 mJ/cm$^2$, 2400 mJ/cm$^2$, and 1500 mJ/cm$^2$.

TABLE 1

| | Test Condition (After Curing for 120 Minutes at Temperature of 110° C.) | Whether or not Haze is generated | | |
|---|---|---|---|---|
| | | Initial stage(0 hr) | 24 hr | 240 h(110° C., 80%) |
| Comparative Example | 3300 mJ/cm$^2$ | ○ | ○ | ○ |
| | 2400 mJ/cm$^2$ | ○ | ○ | ○ |
| | 1500 mJ/cm$^2$ | ○ | ○ | ○ |
| Inventive Example | 3300 mJ/cm$^2$ | x | x | x |
| | 2400 mJ/cm$^2$ | x | x | x |
| | 1500 mJ/cm$^2$ | x | x | x |

In the case of Inventive Example, it could be appreciated that a haze phenomenon was not generated as an observation result of the haze phenomenon at the initial stage, after 24 hours elapses, and after 240 hours elapse at a temperature of 110° C. and a relative humidity of 80% under the conditions of 3300 mJ/cm$^2$, 2400 mJ/cm$^2$, and 1500 mJ/cm$^2$.

On the other hand, in the case of Comparative Example, it could be appreciated that a haze phenomenon due to outgas was generated.

Therefore, it could be appreciated that in the case in which the HDD motor is fabricated using the sealing composition according to Inventive Example, the haze phenomenon due to air leak and outgas at a FPC adhering part may be improved and reliability of a HDD motor may be enhanced due to a reduction in generation of the outgas of the adhering part.

As set forth above, according to the embodiments of the present invention, a sealing resin composition having a new composition may be used as a sealing material of a FPC adhering part of the HDD motor, whereby a haze phenomenon due to air leak and outgas in the FPC adhering part may be improved and reliability of a HDD motor may be enhanced due to a reduction in generation of the outgas of the adhering part.

While the present invention has been shown and described in connection with the embodiments, it will be apparent to those skilled in the art that modifications and variations can be made without departing from the spirit and scope of the invention as defined by the appended claims.

What is claimed is:

1. A sealing composition for a hard disk drive (HDD) motor comprising: 45 to 65 parts by weight of urethane methacrylate; 35 to 50 parts by weight of methacrylate; and 2 to 4 parts by weight of acrylic acid.

2. The sealing composition of claim 1, further comprising 2 to 4 parts by weight of benzophenone.

3. The sealing composition of claim 1, further comprising 1 to 2 parts by weight of a stabilizer.

4. The sealing composition of claim 1, further comprising 1 to 2 parts by weight of an accelerator.

5. The sealing composition of claim 1, wherein the methacrylate has a boiling point of 150° C. or more.

6. The sealing composition of claim 1, wherein the sealing composition is applied to an adhering part by which a flexible printed circuit (FPC) and a coil of the HDD motor are adhered to each other.

7. The sealing composition of claim 6, wherein the adhering part is a land part by which the coil is adhered to the FPC.

8. A hard disk drive (HDD) motor comprising a sealing resin formed on an adhering part between a flexible printed circuit (FPC) and a coil of the HDD motor, wherein the sealing resin is formed from a sealing composition including 45 to 65 parts by weight of urethane methacrylate, 35 to 50 parts by weight of methacrylate, and 2 to 4 parts by weight of acrylic acid.

9. The HDD motor of claim 8, wherein the sealing composition further includes 2 to 4 parts by weight of benzophenone.

10. The HDD motor of claim 8, wherein the sealing composition further includes 1 to 2 parts by weight of a stabilizer.

11. The HDD motor of claim 8, wherein the sealing composition further includes 1 to 2 parts by weight of an accelerator.

12. The HDD motor of claim 8, wherein the adhering part is a land part by which the coil is adhered to the FPC.

13. The HDD motor of claim 8, wherein the methacrylate has a boiling point of 150° C. or more.

* * * * *